United States Patent
Kilcher et al.

(10) Patent No.: US 10,419,731 B2
(45) Date of Patent: Sep. 17, 2019

(54) VIRTUAL IMAGE GENERATOR

(71) Applicant: North Inc., Kitchener (CA)

(72) Inventors: Lucio Kilcher, Montreux (CH); Nicolas Abele, Demoret (CH)

(73) Assignee: NORTH INC., Kitchener, ON (CA)

( * ) Notice: Subject to any disclaimer, the term of this patent is extended or adjusted under 35 U.S.C. 154(b) by 0 days.

(21) Appl. No.: 14/947,938

(22) Filed: Nov. 20, 2015

(65) Prior Publication Data

US 2016/0150201 A1   May 26, 2016

Related U.S. Application Data

(60) Provisional application No. 62/082,575, filed on Nov. 20, 2014.

(51) Int. Cl.

| | |
|---|---|
| *H04N 9/31* | (2006.01) |
| *G02B 7/08* | (2006.01) |
| *G02B 27/01* | (2006.01) |
| *G02B 3/14* | (2006.01) |
| *G02B 26/10* | (2006.01) |
| *G03H 1/26* | (2006.01) |
| *G02B 26/00* | (2006.01) |

(52) U.S. Cl.
CPC ............. *H04N 9/3129* (2013.01); *G02B 7/08* (2013.01); *G02B 26/101* (2013.01); *G02B 26/105* (2013.01); *G02B 27/0103* (2013.01); *G02B 3/14* (2013.01); *G02B 26/004* (2013.01); *G02B 2027/0127* (2013.01); *G03H 2001/266* (2013.01)

(58) Field of Classification Search
CPC ....................... G02B 2027/0127; H04N 9/3129

USPC .......... 348/744, 745; 353/28, 98; 359/201.1, 359/454, 567, 630
See application file for complete search history.

(56) References Cited

U.S. PATENT DOCUMENTS

| | | | | |
|---|---|---|---|---|
| 2,313,947 | A * | 3/1943 | Klinkum | G03B 35/20 359/454 |
| 5,400,110 | A * | 3/1995 | Soshi | G02B 7/102 396/257 |
| 8,783,874 | B1 | 7/2014 | Riza | |
| 9,557,630 | B1 * | 1/2017 | Marason | G03B 21/14 |
| 2004/0085517 | A1 * | 5/2004 | Togino | G02B 27/2228 353/31 |

(Continued)

FOREIGN PATENT DOCUMENTS

WO    20140155288 A2    10/2014

OTHER PUBLICATIONS

International Search Report and Written Opinion received for PCT Patent Application No. PCT/US2015/061965, dated Mar. 11, 2016, 13 pages.

(Continued)

*Primary Examiner* — Paulos M Natnael
(74) *Attorney, Agent, or Firm* — Thomas Mahon

(57) ABSTRACT

Disclosed herein are systems and techniques related to virtual image projection systems. In some examples, the system may include a scanning mirror arrangement for receiving a light beam and reflecting the light beam to a projection surface and a dynamic optical lens for focusing the light beam at a focal plane so that the light beam reflected from the projection surface is collimated or diverging enabling the projected image to be perceived as a virtual image.

20 Claims, 16 Drawing Sheets

(56) References Cited

U.S. PATENT DOCUMENTS

| | | | |
|---|---|---|---|
| 2004/0263608 A1* | 12/2004 | Turner | B41J 2/471 347/260 |
| 2005/0275710 A1* | 12/2005 | Dewa | B41J 2/473 347/237 |
| 2009/0147224 A1 | 6/2009 | Kurozuka et al. | |
| 2009/0295683 A1 | 12/2009 | Pugh et al. | |
| 2010/0060551 A1 | 3/2010 | Sugiyama et al. | |
| 2010/0198081 A1* | 8/2010 | Hanlin | A61B 5/0062 600/478 |
| 2010/0289970 A1 | 11/2010 | Watanabe | |
| 2010/0315605 A1* | 12/2010 | Arita | G02B 26/0816 353/98 |
| 2011/0096136 A1* | 4/2011 | Liu | H04N 7/144 348/14.07 |
| 2011/0188053 A1* | 8/2011 | Buermann | G02B 21/247 356/609 |
| 2011/0285973 A1* | 11/2011 | Togino | G02B 13/08 353/98 |
| 2012/0019923 A1* | 1/2012 | Niesten | G02B 5/26 359/630 |
| 2012/0120375 A1* | 5/2012 | Kilcher | G01S 7/4814 353/98 |
| 2012/0257267 A1* | 10/2012 | Imai | H04N 9/3129 359/201.1 |
| 2012/0293548 A1* | 11/2012 | Perez | G06F 3/012 345/633 |
| 2014/0118829 A1* | 5/2014 | Ma | G02B 5/1885 359/567 |
| 2014/0132852 A1* | 5/2014 | Pawusch | G02B 27/0149 349/11 |
| 2014/0146289 A1* | 5/2014 | Biernath | G03B 21/28 353/28 |
| 2014/0153072 A1 | 8/2014 | Imai | |
| 2014/0226193 A1 | 8/2014 | Sun | |
| 2015/0248790 A1* | 9/2015 | Schowengerdt | G06T 13/40 359/567 |

OTHER PUBLICATIONS

European Search Report for European Patent Application No. 15860080, dated May 18, 2018, 3 pages.

* cited by examiner

VIRTUAL IMAGE GENERATOR

RELATED APPLICATION

This application claims the benefit of U.S. Provisional Application Ser. No. 62/082,575 filed Nov. 20, 2014, entitled "Virtual Image Generator," which application is incorporated herein by reference in its entirety.

TECHNICAL FIELD

Embodiments herein generally relate to optical systems and particularly to scanning mirror systems for generating virtual images.

BACKGROUND

Various image projection systems may project a real image. More specifically, projection systems may project an image onto a display surface for direct viewing. Conversely, various image projection systems may project a virtual image. A virtual image is an image formed when the outgoing rays from a point on an object to be imaged do not converge. As such, an object in the virtual image may appear to be located at the point of apparent divergence of the rays. However, as the object location appears to align with the point of divergence, varying the depth of the image (e.g., object location) may be difficult.

DETAILED DESCRIPTION

Figure 1A:
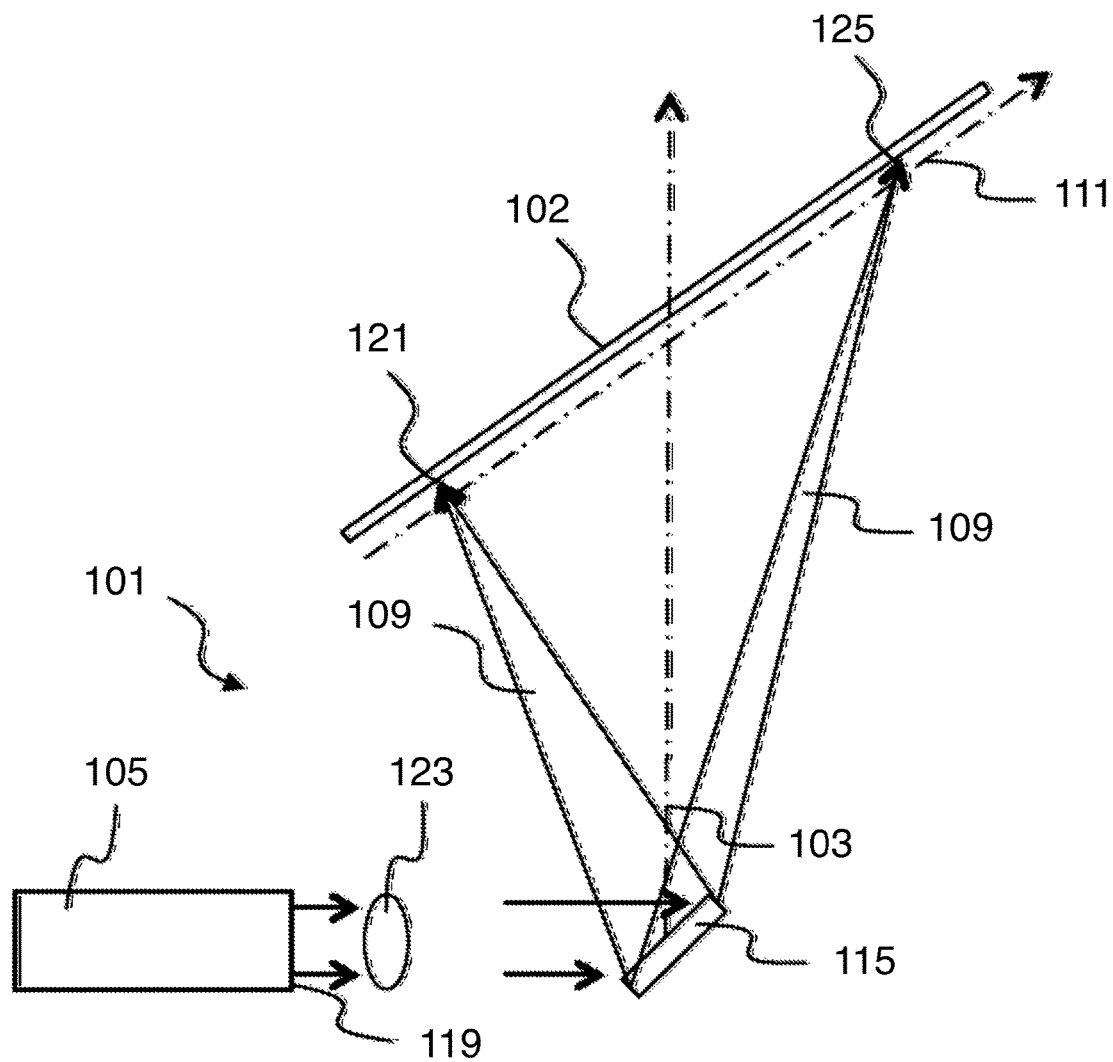
FIGS. 1A-1B illustrate block diagrams of an optical system according to at least a first example of the present disclosure.

Various embodiments described herein are generally directed to an optical projection system including dynamic lenses to adjust a location of a virtual projection surface for a virtual image to change a perception of depth to the projected image.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

Figure 1B:
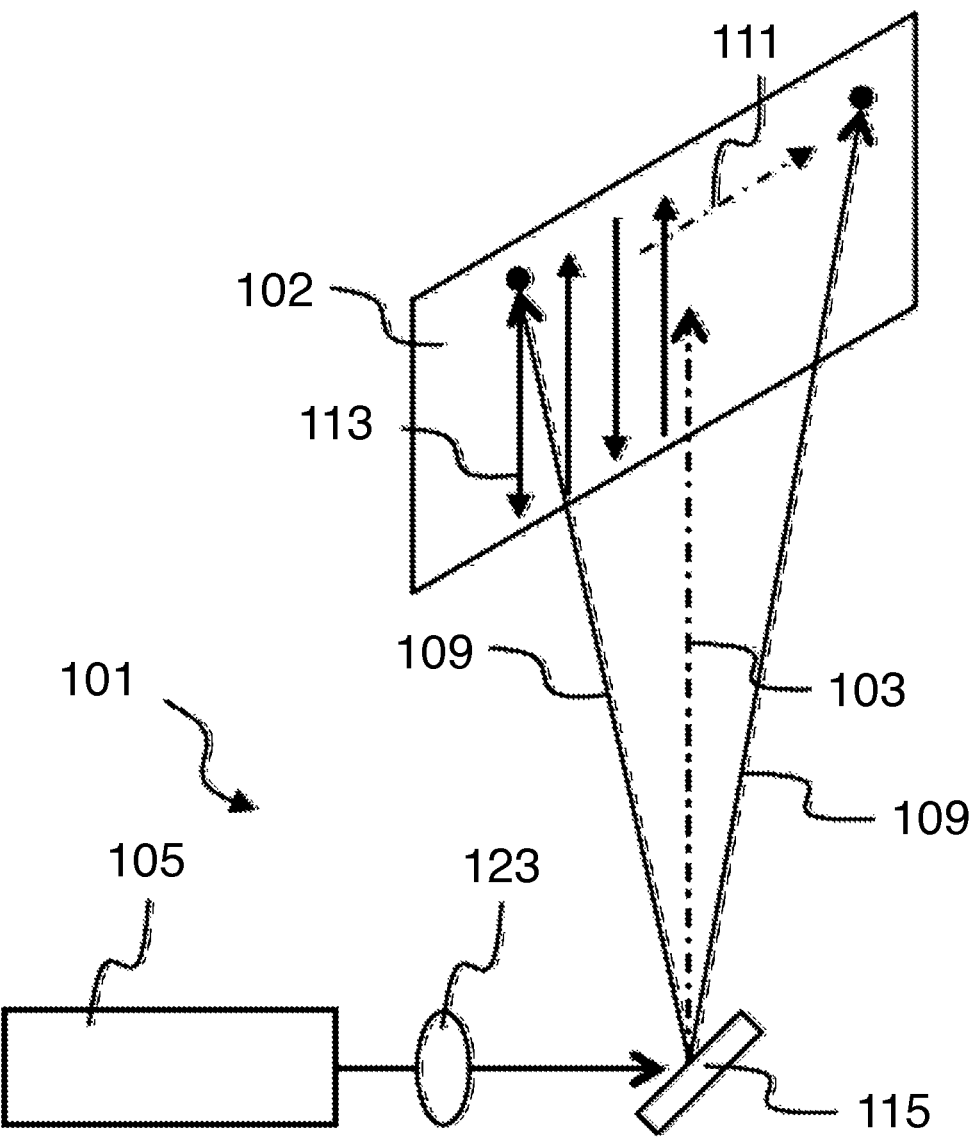

FIGS. 1A-1B illustrate a block diagram of an optical system 101 according to examples of the present disclosure. In particular, FIG. 1A depicts an on-axis view while FIG. 1B depicts an off-axis (e.g., perspective, or the like) view. In general, the optical system 101 may project a real image and may provide the brightness of the projected image to be locally controlled, such as, for example, at the pixel level. In particular, the reflected light beam (and the projected image) can have local brightness adjustments and/or a control of the contrast level between non-illuminated and illuminated pixels. Said differently, the optical system 101 may provide that light is to be sent only where it is needed to project the image. As such, the projected image may be perceived as a virtual image. In particular, the optical system 101 may project a real image and may scan and focus the real image to provide the projected real image to be perceived as a virtual image.

The optical system 101, projects an image onto a surface 102, which in this example, is strongly non-perpendicular to a chief ray 103 (e.g., meridional ray, or the like) of the projection system 101. With some examples, the surface 102 may be reflective so that an image may be projected on the retina of a viewer's eye so that the viewer can perceive the projected real image as a virtual image.

The term "projection surface" is used in this text to refer to any physical surface towards which light emitted from a light source is projected, and from which the light travels onward to a viewpoint, thereby rendering a virtual image visible. For example, the surface may be a transparent or partially transparent body such as a spectacle lens. It is important to note; the term is not used in a narrow sense or to be limited to a physical surface on to which light is projected in order to render a real image visible.

Where a projection surface is strongly non-perpendicular to the chief ray 103 of the image, such as, for example, the surface 102, a projector should be able to focus the pixels of the image at different distances from the projection system 101. It is noted, that large size short throw projectors, for example, matrix based projectors such as Digital Light Processing (DLP), Liquid Crystal on Silicon (LCOS), Organic Light-Emitting Diode (OLED), or the like require high quality, large and costly off-axis projection lenses in order to display sharp images on a projection surface that is strongly non-perpendicular to the chief ray of the projected image.

The optical system 101, which may also be called a light projection system, comprises a light source 105 configured to emit a light beam 109, which is scanned across the surface 102 to project an image onto the surface 102. In particular, the light source 105 emits light from a light source emission surface 119. The light is transmitted through a variable position lens 123, also called a dynamic lens or a movable lens. The lens 123 can be located between the light source 105 and the scanning mirror system 115. The variable position lens 123 can be adjusted, as explained later in more detail below, to focus the light emitted by the source 105. The light is transmitted through the lens 123 and is incident on a scanning mirror 115. In some examples, the scanning mirror system 115 can be a MEMS scanning mirror. With some examples, the optical system 101, including the mirrors, is configured to perform a raster scanning operation or a Lissajou scanning operation. In particular, the mirror system 115 may rotate to scan the light beam 109 across the surface 102 (e.g., between points 121 and 125, or the like) in the direction of axis 111 and axis 113, to form an image or to project an image onto the surface 102.

In general, the lens 123 is to focus the light beam 109 at a virtual focal surface (e.g., refer to FIGS. 13-16) or at the projection surface 102, thereby creating a pixel at point 121 and/or point 125. During the image generation process the scanning mirror system 115 scans the light beam 109 in several locations on the projection surface 102 to reflect the whole image on the surface 102 (e.g., between points 121 and 125, or the like). As can be seen, the distance between point 121 and the scanning mirror system 115 is different from the distance between point 125 and the scanning mirror system 115. This is because the projection surface 102 is substantially non-orthogonal to the chief ray 103. With some examples, the distance between the scanning mirror 115 and the focal surface 102 is between 3 mm and 300 mm.

In some examples, the light source 105 may be a laser, a superluminescent diode (SLED), a microLED, a resonant-cavity light emitting diode (RCLED), a vertical-cavity surface-emitting laser (VCSEL) light source, or the like. In some examples, the light source 105 may be a single light source or may be multiple light sources. In some examples, where multiple light sources are provided, optical coupling devices may be provided. For example, a beam combiner and/or dichroic plates may be provided.

In particular, the scanning mirror system 115 may comprise a movable plate and a mirror arranged to be rotated about two mutually orthogonal axes. In some examples, the mirror may rotate about one axis. In some examples, the system 115 may comprise two mirrors, where each mirror rotates about one axis. In particular, each mirror may rotate about mutually orthogonal axes.

With some examples, the mirror system 115 may scan the light beam 109 at a speed of 1 kHz to 80 kHz per line in a horizontal direction (e.g., in the direction of axis 111, or the like). In some examples, the mirror system 115 may scan the light beam 109 at a speed of 1 Hz to 200 Hz per line in a vertical direction (e.g., in the direction of axis 113, or the like). Accordingly, an image can be generated by raster scanning the pixels of the entire image, line by line, for example from the top to the bottom of the projection surface 102. After which, the mirror 115 returns to an original position. This period is called a flyback period where no image is projected during the flyback period. With some examples, an interlaced projection may be implemented, for example, where the image is projected from top to bottom and then from bottom to top (e.g., in an interlaced manner). In some examples, a Lissajou-type projection technique may be implemented, for example, to include higher horizontal and vertical axis frequencies (e.g., from 600 Hz to 80 kHz for each axis, or the like).

In general, the displacement of the variable position lens 123 with respect to the mirror 115 may be changed dynamically during operation. In some examples, the lens 123 may comprise an electro-active polymer. As such, applying electric current to the lens 123 may physically deform the lens 123 and consequently the displacement of the lens 123 can be varied. In some examples, the lens 123 may be a piezo-actuated rigid or polymer lens, in which the lens is actuated with a driving signal to cause the lens to physically move to a different location. In some examples, the driving signal may be provided by a controller (e.g., the controller 1890 depicted in FIG. 17).

FIGS. 2-5 illustrate block diagrams of various examples of the system 101. It is noted that these examples are discussed with respect to the system 101 depicted in FIG. 1 and particularly, components of the depicted systems may use similar numerical designations for convenience and clarity. However, examples, are not limited in these contexts.

Figure 2:
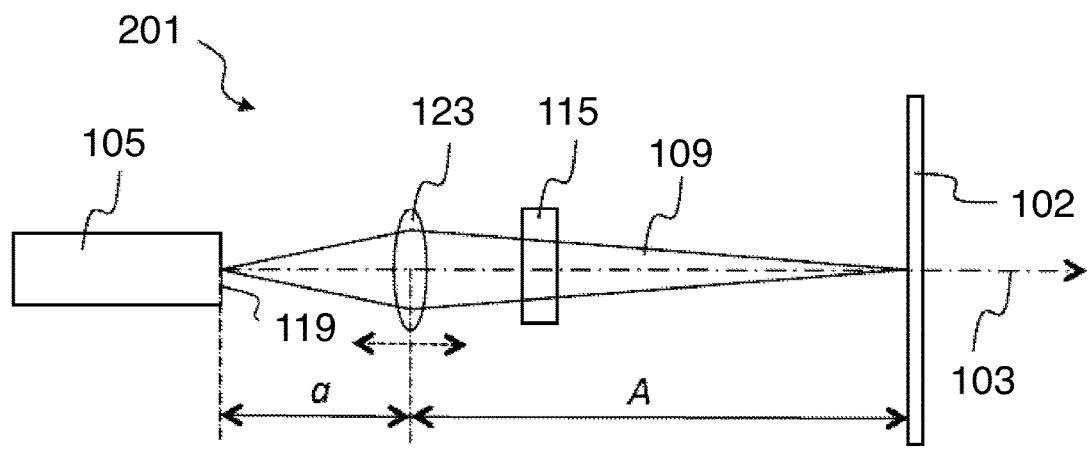
FIG. 2 illustrates a block diagram of an optical system according to at least a second example of the present disclosure.

Turning to FIG. 2, a system 201 is depicted. In the system 201, the larger the distance A between the variable position lens 123 and the projection surface 102, the smaller is the distance a between the light source emission point 119 and the variable position lens 123. The relationship between the distance a and the distance A can be defined by the following formula:

$$a = \frac{fp * A}{A - fp}$$

where a is the distance from the light source emission point 119 to the variable position lens 123, fp is the focal length of the variable position lens 123, and A is the distance from the variable position lens 123 to the projection surface 102. As an example, if the variable position lens 123 has a focal length fp=6 mm and distance A from the variable position lens 123 to the projection surface 102 is in the range of 20 mm to 40 mm, then the distance a from the light source emission point 119 to variable position lens 123 will vary between 8.57 mm (when A=20 mm) and 7.05 mm (when A=40 mm). It is to be noted that the A can be measured with specific distance measurement techniques, such as, for example, triangulation techniques, which may be included in the optical system 201. By adjusting the variable position lens 123, the variations in the optical path between the projection surface 102 and the scanning mirror system 115 can be compensated within one image.

Figure 3:
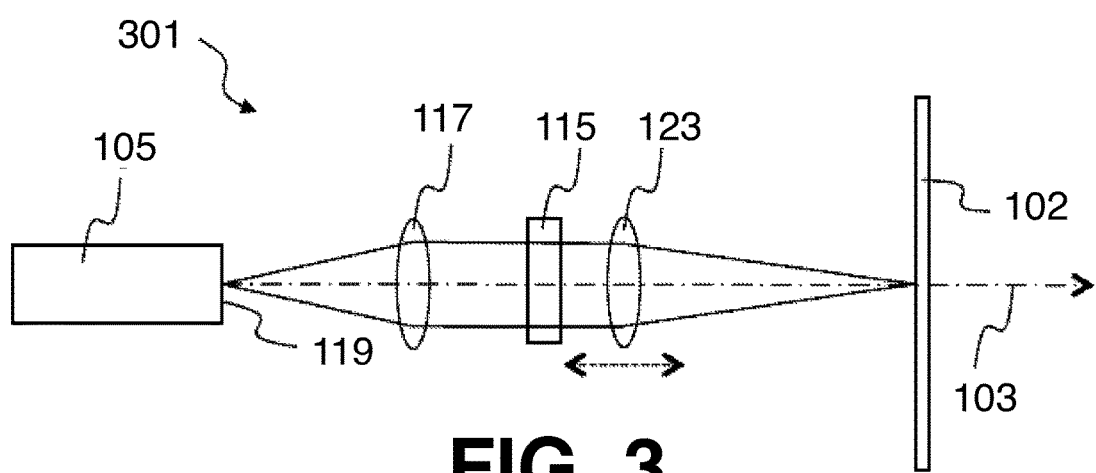
FIG. 3 illustrates a block diagram of an optical system according to at least a third example of the present disclosure.

Turning to FIG. 3, a system 301 is depicted. In the system 301, the variable position lens 123 can be disposed between the scanning mirror system 115 and the projection surface 102. Additionally, the system 101 may comprise a fixed focal length and/or static collimation lens 117, which can be placed between the light source 105 and the scanning mirror system 115. With some examples, the system 101 depicted in this figure may be provided such that the variable position focusing lens 123 may adjust the scanned light beam focusing spot distances in the sub-millimeter range. In particular, the displacement of the variable position lens 123 may correspond to the actual displacement of the points 121 and/or 125.

Figure 4:
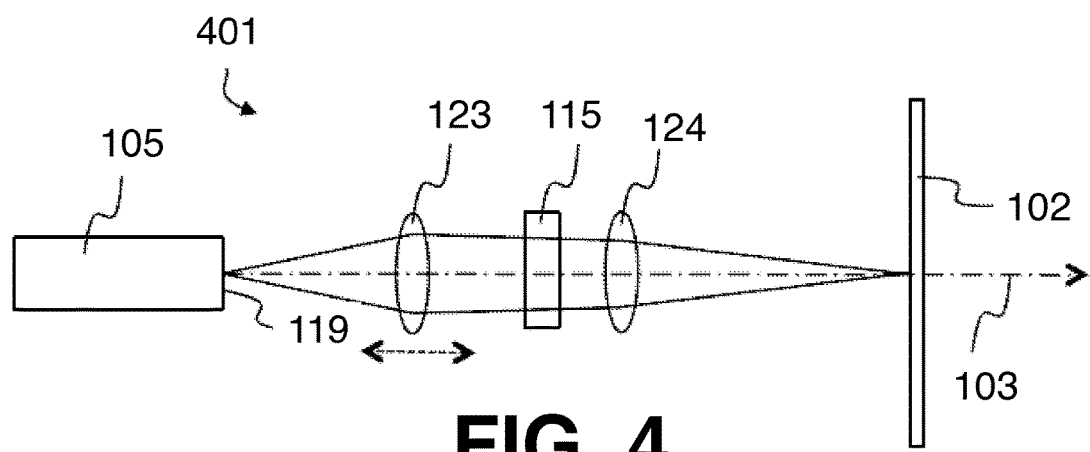
FIG. 4 illustrates a block diagram of an optical system according to at least a fourth example of the present disclosure.

Turning to FIG. 4, a system 401 is depicted. In the system 401, the variable position lens 123 can be disposed between the light source 105 and the scanning mirror system 115. Additionally, the system 101 may comprise a fixed focal length and/or static projection lens 124, disposed between the scanning mirror system 115 and the projection surface 102. The system 101 depicted in this figure may be provided such that the projection lens 124 focuses the projected image to the projection surface 102 while the variable position lens 123 is manipulated to adjust the location of the focused image projected to projection surface 102. Accordingly, the system 101 depicted in this figure allows for bigger displacements of the focused projected image location on the projection surface 102. With some examples, the system 101 depicted in this system may be implemented in wearable display applications, in which the projected image must be focused on to a virtual focal surface 140 and displaced by several millimeters to be focused at other virtual focal surfaces 141 and/or 142 (refer to FIGS. 13-16) to vary the visual depth of the image to be perceived by a user.

Figure 5:
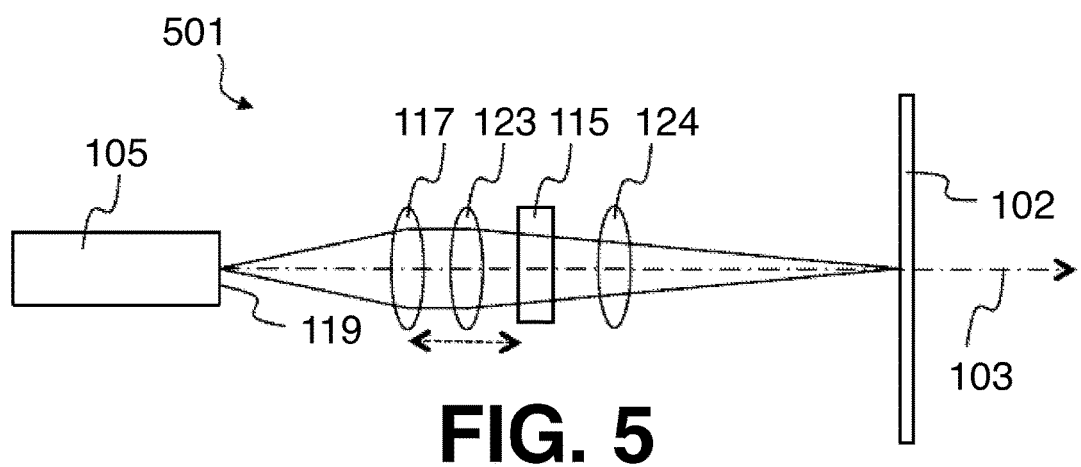
FIG. 5 illustrates a block diagram of an optical system according to at least a fifth example of the present disclosure.

Turning to FIG. 5, a system 501 is depicted. In the system 501, the variable position lens 123 can be disposed between the fixed focal length and/or static collimation lens 117 and the scanning mirror system 115. The lens 117 is in turn disposed in front of the light source 105. Accordingly, the system 101 depicted in this figure comprises a fixed focal length and/or static projection lens 124, which is disposed between the scanning mirror system 115 and the projection surface 102. In general, the combination of the collimation lens 117 and the variable position lens 123 may provide greater precision of the focused projected image location on the projection surface 102, for example, as compared to other systems. With some examples, the system 101 depicted in this system may be implemented in wearable display applications, in which the projected image must be focused onto a virtual focal surface 140 (refer to FIGS. 13-16) and displaced by several millimeters to be focused at other virtual focal surfaces 141 and/or 142 (refer to FIGS. 13-16) to vary the visual depth of the image to be perceived by a user.

Figure 6:
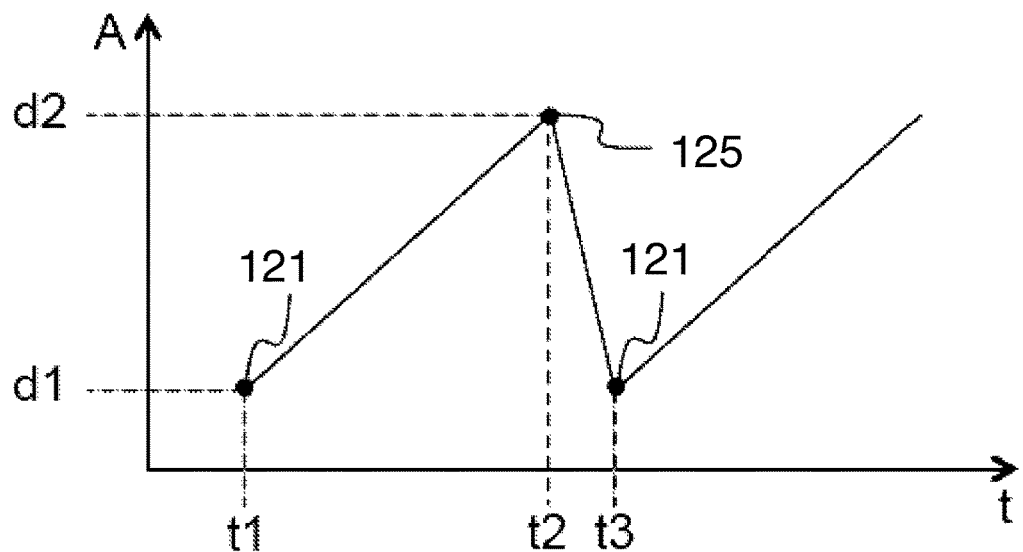
FIG. 6 illustrates a graph depicting a relationship between a displacement of a dynamic lens of an optical system and time, arranged according to examples of the present disclosure.

FIG. 6 illustrates a chart 600 depicting a relationship between time t and the distance A from the variable position lens 123 to the projection surface 102. As depicted, at time instant t1, the distance A is equal to d1. At this position, the pixel at point 121 is projected onto the surface 102. This may be the minimum value of the distance A. In this example the pixel at point 121 would be the pixel on the surface 102 that is closest to the scanning mirror system 115. If the distance A is then increased linearly until time instant t2, the distance A may be at its maximum value d2. At this position the pixel at point 125 is projected on the surface 102. In this case the pixel at point 125 would be the pixel on the surface 102 that is farthest from the scanning mirror system 115. The variable position lens 123 is then moved rapidly back to its initial position so that at time instant t3 a new image can be scanned starting again with the pixel at point 121. As depicted, the variable position lens 123 only follows the movement of the slow axis of the scanning mirror system 115, which is explained in greater detail below. However, in some examples, the variable position lens 123 may follow the movement of the fast axis of the scanning mirror system 115, or the variable position lens 123 may follow the movements of both the slow and fast axes of the scanning mirror system 115.

FIGS. 7-10 illustrate block diagrams of various examples of the system 101. It is noted that these examples are discussed with respect to the system 101 depicted in FIG. 1 and particularly, components of the depicted systems may use similar numerical designations for convenience and clarity. However, examples, are not limited in these contexts.

Figure 7:
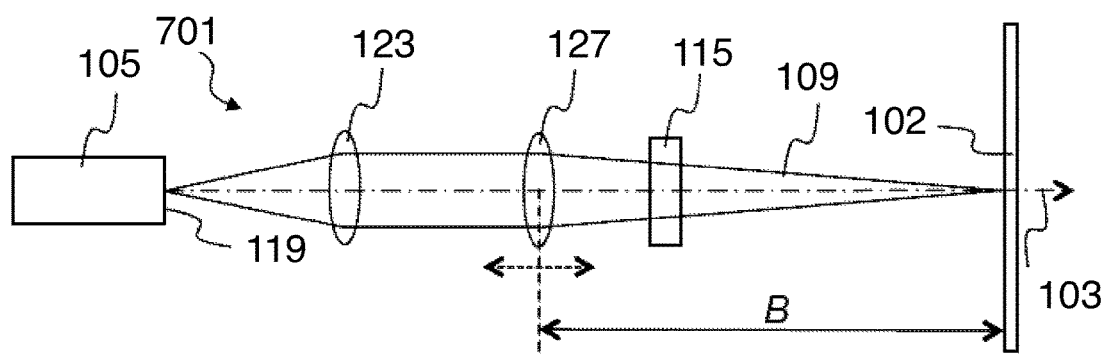
FIG. 7 illustrates a block diagram of an optical system according to at least a sixth example of the present disclosure.

Turning to FIG. 7, a system 701 is depicted. The system 701 may include a variable focal length lens 127, also referred to as a dynamic lens. In some examples, the system 701 may be implemented to include the variable focal length lens 127 instead of the lens 123 (e.g., the lens 123 depicts in FIGS. 1-5, or the like). Furthermore, a fixed focal length and/or static collimation lens 117 is disposed between the light source 105 and the variable focal length lens 127. The collimation lens 117 to light source emission surface 119 distance can remain fixed. The scanned light beam 109 is focused by the variable focal length lens 127. Thus, the variable focal length lens 127 may focus the light beam 109 that has been collimated by the collimation lens 117 at a virtual focal surface or at the projection surface 102. The focal length can be changed by dynamically varying the lens curvature. In some examples, the lens 127 may comprise an electro-active polymer. As such, applying electric current to the lens 127 may physically deform the lens 127 and consequently the curvature of the lens 127 can be varied. In some examples, the lens 127 may be a piezo-actuated rigid or polymer lens, in which the lens is actuated with a driving signal to cause the lens to physically change shape, thereby dynamically changing the focal length. In some examples, the driving signal may be provided by a controller (e.g., the controller 1890 depicted in FIG. 17).

As depicted, the larger the distance B from the variable focal length lens 127 to the projection surface 102, the larger the focal length of the lens. The relationship between the focal length f of the variable focal length lens 127 and the distance B from the variable focal length lens 127 to the projection surface 102 may be defined by the following formula:

$$f=B$$

where f is the focal length of the variable focal length lens 127 and B is the distance from the variable focal length lens 127 to the projection surface 102. As an example, if the distance B variation from closest pixel to the furthest pixel is in the range 20 mm to 40 mm, then the focal length f of the variable focal length lens 127 will be in the range 20 mm to 40 mm. The distance B variation may be in practice in the range 3 mm to 300 mm for certain applications.

Figure 8:
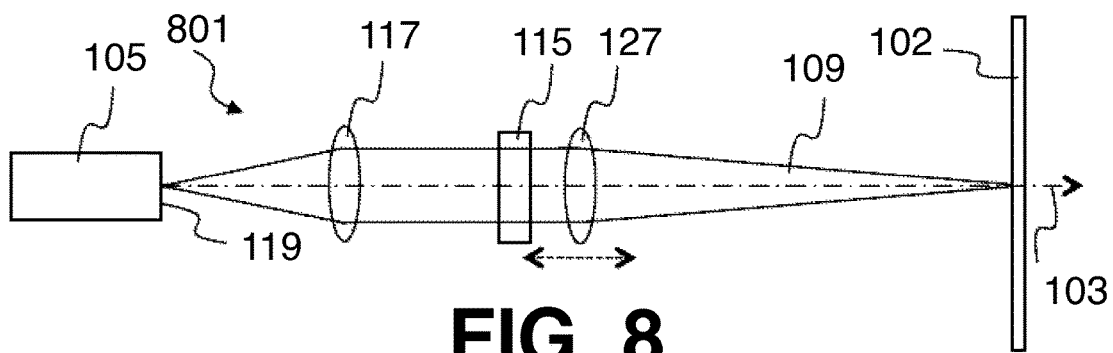
FIG. 8 illustrates a block diagram of an optical system according to at least a seventh example of the present disclosure.

Turning to FIG. 8, a system 801 is depicted. In the system 801, the variable focal length lens 127 is disposed between the scanning mirror system 115 and the projection surface 102. As such, the fixed focal length and/or static collimation lens 117 is disposed between the light source 105 and the scanning mirror system 115. Accordingly, the system 801, and particularly, the variable focal length focusing lens 127 is able to precisely adjust the beam 109 focusing spot distances over a range (e.g., tens of millimeters, or the like). In this configuration, the focal length of the variable focal length lens 127 may correspond to the actual distance from the focusing spot 121 and/or 125 to the variable focal length lens 127. With some examples, the system 801 may be implemented in a wristwatch projector, in which the distance between the focusing spot and the variable focal length lens 127 is to have a large variation range.

Figure 9:
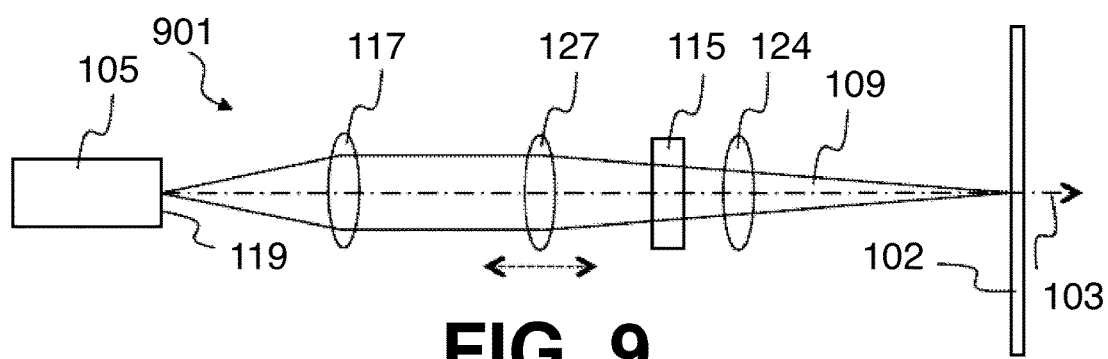
FIG. 9 illustrates a block diagram of an optical system according to at least an eighth example of the present disclosure.

Turning to FIG. 9, a system 901 is depicted. In the system 901, the variable focal length lens 127 is disposed between the fixed focal length and/or static collimation lens 117 and the scanning mirror system 115. The fixed focal length and/or static collimation lens 117 is in turn disposed in front of the light source 105. Additionally, the system 901 includes the fixed focal length and/or static projection lens 124, which is placed between the scanning mirror system 115 and the projection surface 102. Accordingly, the system 901, and particularly, the lens 124 focuses the projected image to the projection surface 102, while the variable focal length lens 127 only has to finely adjust the location of the focused image projected to projection surface 102.

Figure 10:
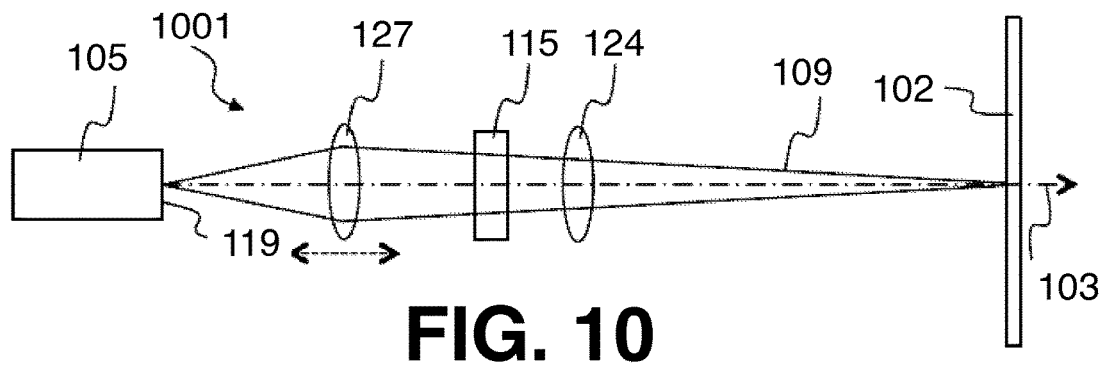
FIG. 10 illustrates a block diagram of an optical system according to at least a ninth example of the present disclosure.

Turning to FIG. 10, a system 1001 is depicted. In the system 1001, the variable focal length lens 127 is disposed between the light source 105 and the scanning mirror system 115. Additionally, the fixed focal length and/or static projection lens 124 is disposed between the scanning mirror system 115 and the projection surface 102. Accordingly, the system 1001, and particularly the fixed focal length and/or static projection lens 124 focuses the projected image to the projection surface 102 while the variable focal length focusing lens 127 only has to finely adjust the location of the focused image projected to projection surface 102.

Figure 11:
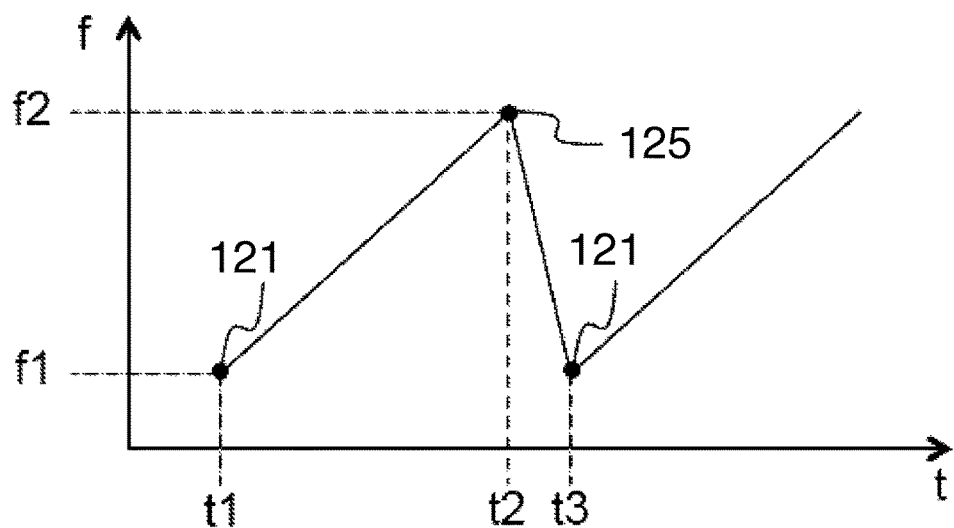
FIG. 11 illustrates a graph depicting a relationship between a focal length of a dynamic lens of an optical system and time, arranged according to examples of the present disclosure.

FIG. 11 illustrates a chart 1100 that depicts the relationship between time t and the focal length f of the variable focal length lens 127. At time instant t1 the focal length f is equal to f1. At this position the pixel projected to point 121 is projected on the surface 102. This may be the minimal value that the focal length f can take. In this case the pixel at point 121 would be on the surface 102 that is closest to the scanning mirror system 115. Now the focal length f is increased linearly until time instant t2. At this time instant the focal length f takes its maximum value f2. At this position the pixel projected to point 125 is projected and focused on the surface 102. In this case the pixel at point 125 would be the pixel on the surface 102 that is furthest from the scanning mirror system 115. After this, the variable focal length lens 127 is moved rapidly back to its initial focal length f1, close to the light source 105, so that at time instant t3 a new image can be scanned starting again from the pixel at point 121. In some examples, the variable focal length lens 127 only follows the movement of the slow axis of the scanning mirror system 115, as explained later more in detail. In some examples, the variable focal length lens 127 can follows the movement of the fast axis of the scanning mirror system 115 or the variable focal length lens 127 can follow the movements of both the slow and fast axes of the scanning mirror system 115.

With some examples, in the optical system 101, or any of the optical systems (e.g., 201, 301, 401, 501, 701, 801, 901, 1001, or the like) described above, the dynamic lens(s) (e.g., the lens 123, the lens 127, both lenses 123 and 127, or the like) may be oriented with the mirror axis 113. In some examples, in the optical system 101, or any of the optical systems (e.g., 201, 301, 401, 501, 701, 801, 901, 1001, or the like) described above, the dynamic lens(s) (e.g., the lens 123, the lens 127, both lenses 123 and 127, or the like) may be oriented with the mirror axis 111.

With some examples, in the optical system 101, or any of the optical systems (e.g., 201, 301, 401, 501, 701, 801, 901, 1001, or the like) described above, the dynamic lens(s) (e.g., the lens 123, the lens 127, both lenses 123 and 127, or the like) may be oriented with the mirror axis having the largest variation in the distance between the dynamic lens and the projection area. With some examples, the distance (e.g., the variation in the distance, or the like) may be detected by camera triangulation techniques, by distance sensing device, or selected or provided in advance.

It is noted, that the solid lines in FIG. 1B correspond to the fast mirror axis (e.g., the vertical axis 113) while the dashed scan lines correspond to the slow mirror axis (e.g., the horizontal axis 111). In some examples, the slow axis oscillation is synchronized with the focal length variation of the variable focal length lens 127 or the displacement variation of the variable position lens 123 to keep the scanned light beam 109 focused on the projection surface 102 at all times, even within one image. By correctly choosing the orientation of the slow and fast axes of the scanning mirror system 115, it is possible to have one adjustment position of the dynamic lens for each of the displayed vertical lines. As a specific example, for a projected image with 640 vertical lines and a refresh rate of 60 Hz, the displacement or focal length change of the dynamic lens between the minimum and the maximum value can be dynamically adjusted within $\frac{1}{60}$ s=16 ms.

Figure 12:
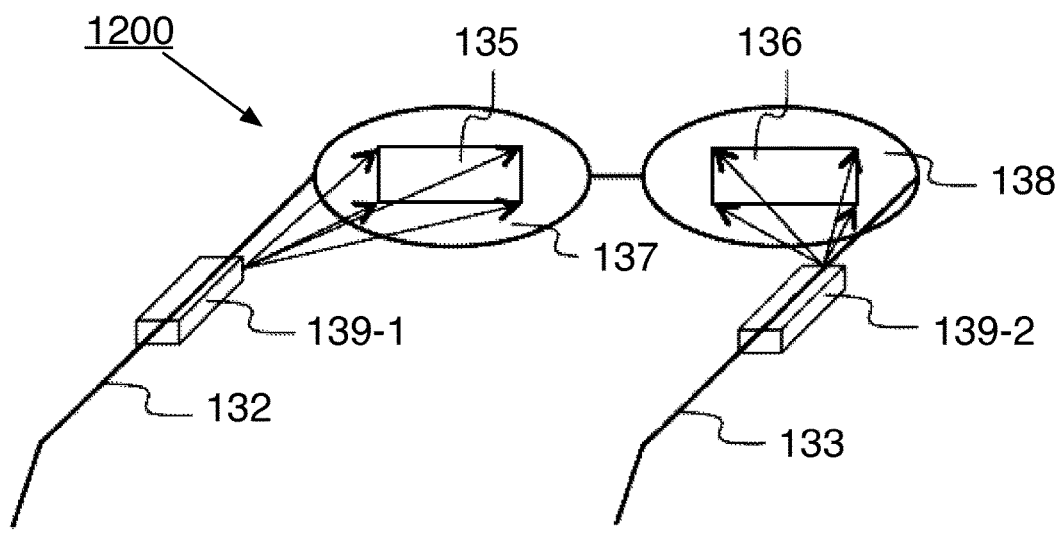
FIG. 12 illustrates a block diagram of a first example wearable device including an optical system according to the present disclosure.

FIG. 12 illustrates an example implementation of the present disclosure. In particular, this figure depicts a wearable device 1200, which may be implemented as a pair of glasses, also referred to as spectacles, such as, for example, reading glasses, sunglasses, smart glasses, or the like. In particular, the device 1200 may be augmented and/or virtual reality spectacles. The device 1200 may include 2DOF MEMS-based raster scanning projectors 139-1 and 139-2. The projectors 139 may comprise any of the optical systems described above (e.g., the system 101, 201, 301, 401, 501, 701, 801, 901, 1001, or the like). In particular, each of the projectors 139 may comprising the light source 105, the dynamic lens (e.g., the lens 123, the lens 127, or the like) and the scanning mirror system 115. The projectors 139 are mounted on each of the left and right side the glasses frame. For example, the projector 139-1 is mounted on the frame at location 132 while the projector 139-2 is mounted on the frame at location 133.

Each of the projectors 139 projects an independent image. In particular, the projector 139-1 projects the image 135 onto the spectacle lens 137 while the projector 139-2 projects the image 136 onto the spectacle lens 138. The spectacle lenses 137 and 138, also referred to as relay optics, may be holographic, ellipsoid or light-diffraction-based see-through or non-see-through combiners that allow the user to see a real outdoor image and the projected image at the same time. The lenses 137 and 138 may comprise optical fibers or a bundle of optical fibers.

The images 135 and 136 projected to the spectacle lenses 137 and 138 are reflected by the combiners towards a user's eye-pupil location (e.g., the location 45 in FIGS. 13-16). The reflected beams may be collimated to provide for the user to perceive the image as having an infinite visual depth without the need for accommodating the optical characteristics of the user's eye lens.

To collimate the reflected beams, the projected image may be focused before the spectacle lenses 137 and 138. In particular, the image may be focused on a virtual surface. This is illustrated in greater detail in FIGS. 13-16. Referring to these figures collectively, a portion of the system 1200 is depicted in greater detail. In particular, these figure depict the projected image being focused on a virtual surface 140, also referred to as a virtual plane proximate to the projection surface (e.g., the spectacle lens 138). Although these figures are described with reference to the spectacle lens 138, they may be applicable to the spectacle lens 137, or the projection surface 102 described above. Examples are not limited in this context. It is noted that the virtual plane may not necessarily be a mathematical plane. It is also noted that the variable position lens 123 shown these figures could instead be the variable focal length lens 127. In some examples, the virtual surface 140 may have a planar, spherical, aspherical, polynomial, or free form shape. In some examples, the shape of the surface 140 may be defined by a beam combiner implemented in the system.

Figure 14:
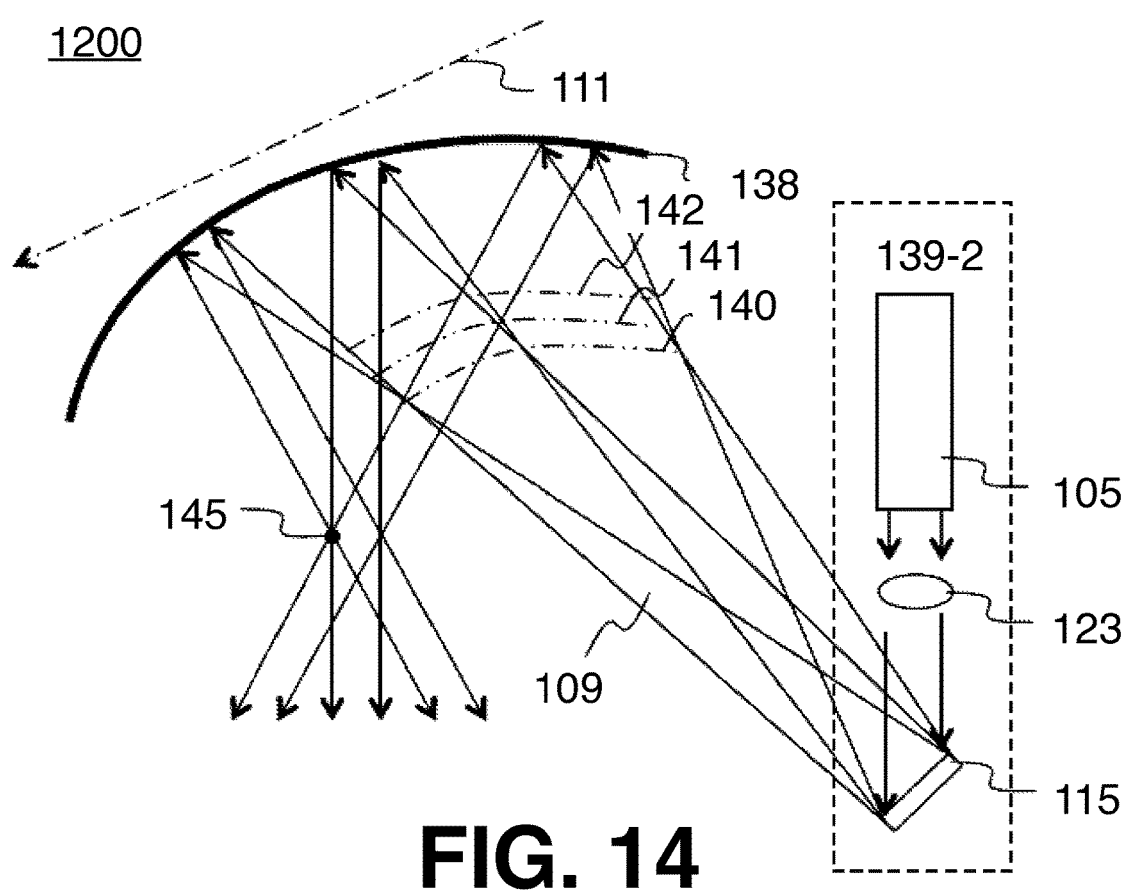

With some examples, the projection surface 138 and the virtual focal surface 140, 141, and/or 142 are parallel. With some examples, the virtual focal surface 140, 141, and/or 142 may be curved, such as, for example, as shown in FIG. 14. Accordingly, a viewer may perceive a virtual image that matches the curvature of the retina and therefore the perceived virtual image may be perceived by the viewer as being even more natural. The projection surface 138 may or may not have the same shape as the virtual focal surfaces.

Figure 15:
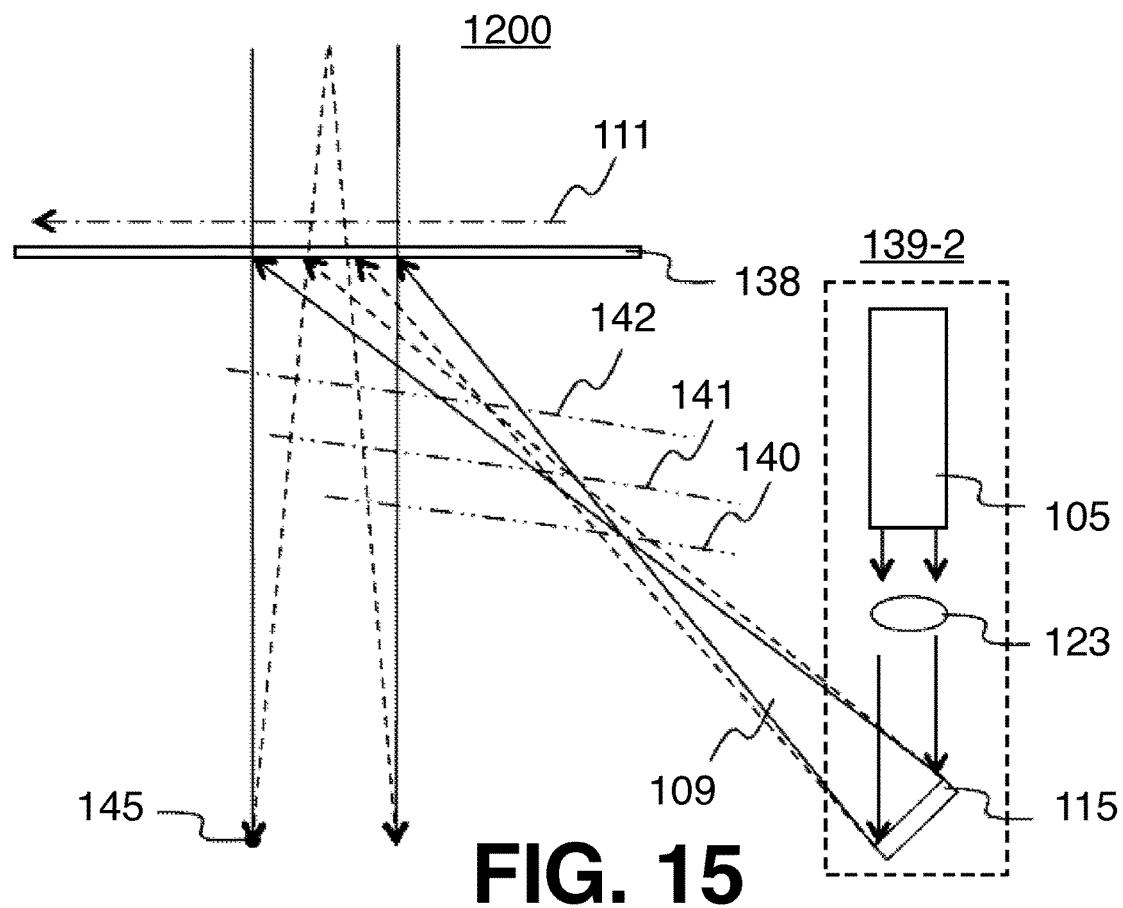
Figure 16:
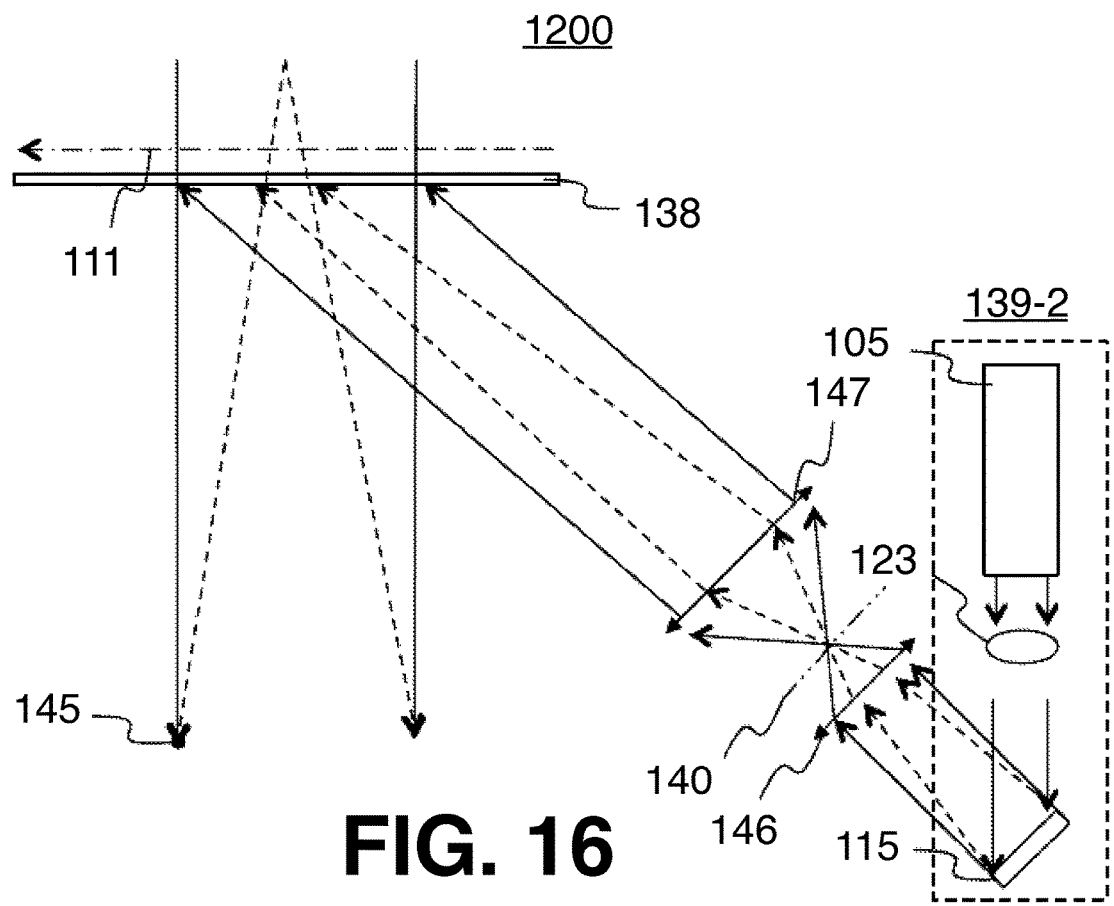

With some examples, the beams reflected by the spectacle lenses 138 may be divergent, for example, as shown in FIGS. 15-16. In order for the reflected light to be divergent, the projected image (e.g., each of the light beam 109 defining the pixels of the image) is focused between the spectacle lens 138 and virtual focal surface 40. Alternative virtual focal surfaces 141 and 142 are also depicted. It is noted, that the closer the focal surface (e.g., the surface 140, 141, 142, or the like) is to the spectacle lens 138, the closer the image visual depth will appear.

As used herein, the term virtual focal surface or virtual plane is intended to refer to a virtual surface defined by a collection of focal points in two dimensions (in the case of a planar virtual surface) or in three dimensions (in the case of a spherical, aspherical, polynomial or free-form shape as mentioned above), each of the points being the focal point of an individual light beam corresponding to a particular pixel of the image.

Turning more particularly to FIG. 16, the system 1300 may include optical lenses 146 and/or 147 disposed between the scanning mirror 115 and the projection surface (e.g., the spectacle lens 138). The lenses 146 and 147 may be disposed proximate to each other with a specified separation between them. In particular, the lenses 146 and 147 may be positioned to expand the beam 109 and direct the beam 109 back to the spectacle lens 138. The lenses 146 and 147 may have different focal lengths from each other. In some examples, the lens 146 may have a lower focal length than the lens 147. Accordingly, the eyebox (e.g., the area where the image will be seen by a viewer) may increase, thereby providing that the image may still be visible even if the viewing position moves within a certain range.

It is important to note, that in the examples of FIGS. 13-16, the focal plane is located before the projection surface 138. In other words, the virtual focal surface is located between the projection surface 138 and the scanning mirror arrangement 115. However, the virtual focal surface could alternatively coincide with the projection surface or be located behind it. It is to be noted that what defines the distance perception is not the beam spot size on the projection surface, but the convergence/divergence angle of the light beam (e.g., the beams 109 in FIG. 1) reaching the projection surface 102. According to the present disclosure, it is possible to modify the angle of each of those beams by adjusting the focal length of the lens 127 or by displacing the movable lens 123. This will result in a modified pixel spot size on the projection surface 102.

Figure 17:
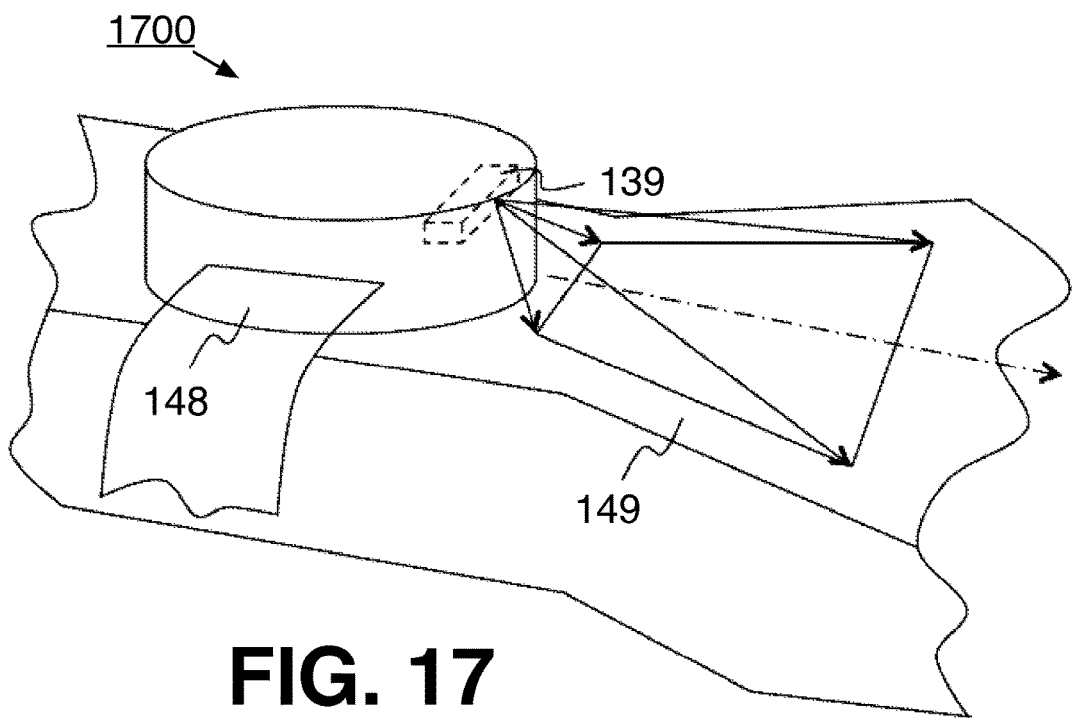
FIG. 17 illustrates a block diagram of a second example wearable device including an optical system according to the present disclosure.
Figure 13:
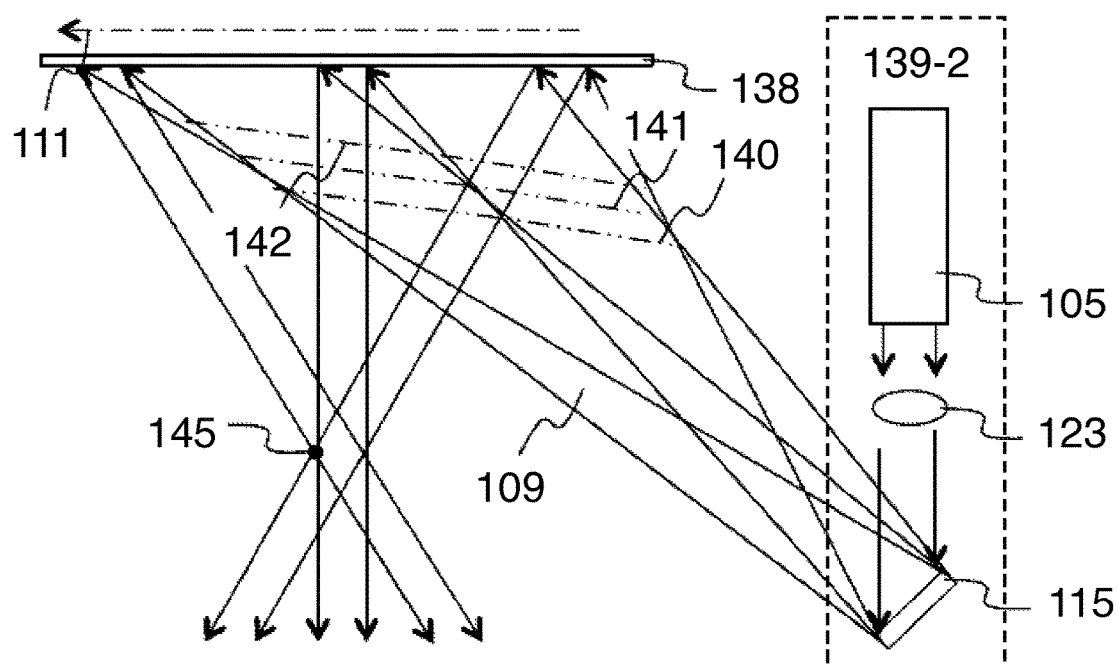
FIGS. 13-16 illustrate block diagrams of portions of the wearable device of FIG. 12, arranged according to examples of the present disclosure.

FIG. 17 illustrates an example implementation of the present disclosure. In particular, this figure depicts a wearable device 1700, which may be implemented as a wristwatch, such as, for example, a smart watch. The device 1700 may include a 2DOF MEMS-based scanning projector 139 disposed within a housing 148 of the device 1700. The projector 139 may be configured to project an image onto a surface proximate to the device 1700, such as, for example, a wearer's hand 149, or the like. With some examples, the projector 139 may be oriented so that the slow moving mirror axis (e.g., the axis 111, or the like) is oriented along the direction on the surface proximate the device 1700 (e.g., the back of a wearer's hand, or the like) that has the largest variation in the distance between the dynamic lens in the device (e.g., the lens 123, 127, and/or the like) and the proximate surface.

Figure 18:
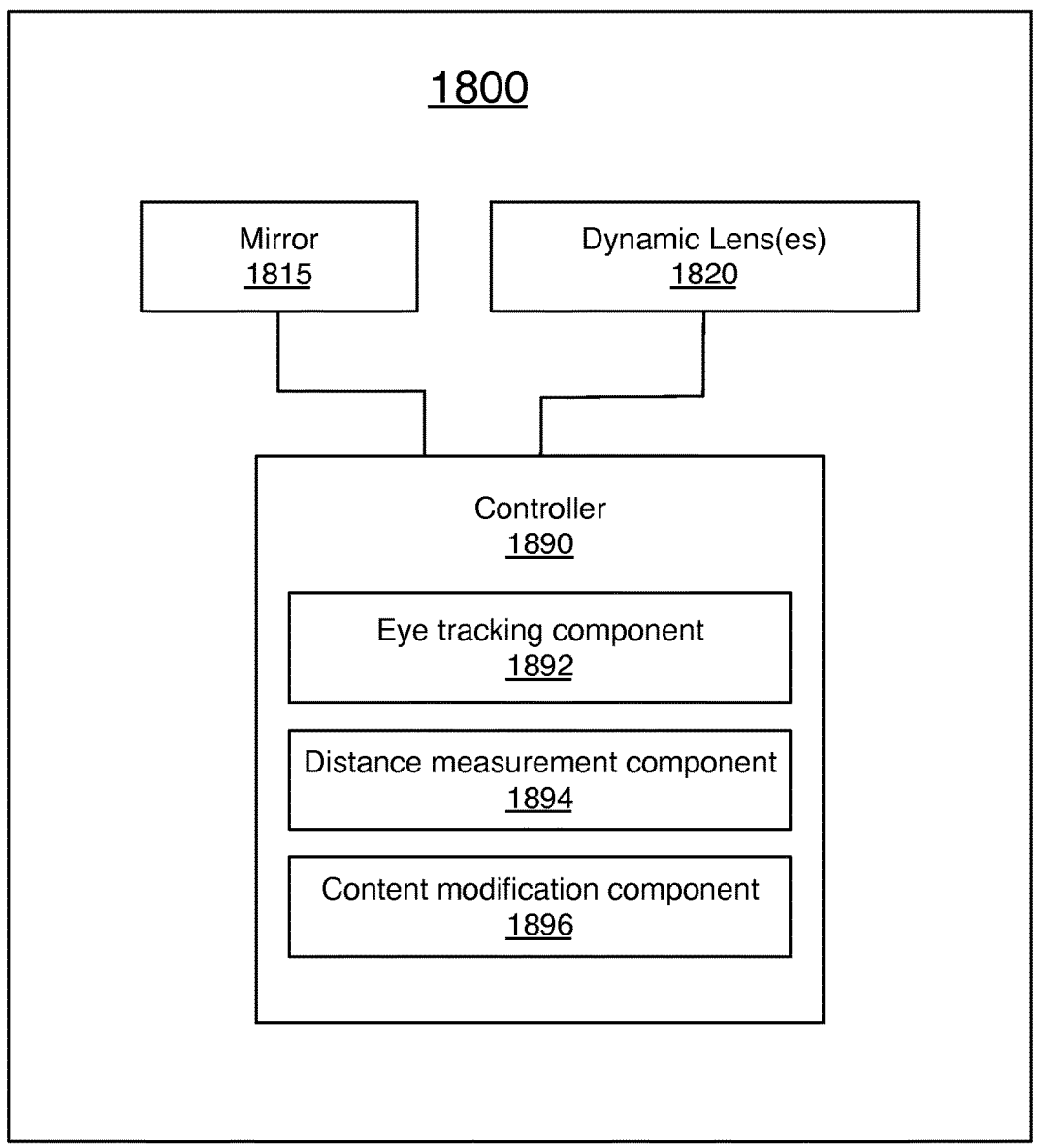
FIG. 18 illustrates a block diagram of an optical system according to at least a ninth example of the present disclosure.

FIG. 18 illustrates a block diagram of an example optical system 1800. The optical system 1700 may be implemented in any of the optical systems described herein, such as, for example, the optical system 101, 201, 301, 401, 501, 701, 801, 901, and/or 1001 described above. In general, the optical system 1800 may be implemented to dynamically focus pixels of an image during projection of the image to project the image onto a projection surface to provide a perception of depth and/or a perceived distance to the image. In particular, the system 1800 may include a mirror 1815 and a number of dynamic lenses 1820. The mirror 1815 and the dynamic lens(es) 1820 are optically coupled such that the mirror 1815 and the dynamic lens(es) 1820 may receive a light beam and scan the light beam over a display surface while dynamically focusing the scanned light beam to focus individual pixels of a projected image. The system 1800 may additionally include a controller 1890 operably coupled to the mirror 1815 and the dynamic lens(es) 1820 to cause the mirror 1815 to scan the received light beam and the dynamic lens(es) 1820 to focus the received and/or scanned light beam during operation.

In general, the controller 1890 may comprise hardware and may be configured to execute instructions to cause the controller 1890 to send one or more control signals to the mirror 1815 and the dynamic lens(es) 1820, the control signal to cause the mirror 1815 to rotate about a number of axes and the dynamic lens(es) 1820 to be displaced and/or adjust a focal length of the lens(es) 1820.

The controller 1890 may include an eye tracking component 1892. The eye tracking component 1892 may include a camera or a combination of an LED, a VCSEL, a microLED, an RCLED or a laser-based illumination source and a photo-sensor, such as a photodiode or an array of photodiodes. The eye tracking component 1892 may be configured to track and/or determine a position or viewpoint of a user's or wearer's eyes.

The controller 1890 may include a distance measurement component 1894. The distance measurement component 1894 may include a camera or a combination of an LED, a VCSEL, a microLED, an RCLED or a laser-based illumination source and a photo-sensor, such as a photodiode or an array of photodiodes. The distance measurement component 1894 may be operably coupled to the eye-tracking component 1892 (and in some examples, may be implemented with the same structure) to determine an apparent distance of an object from the viewer, where the object in a virtual image to be projected on the surface 102.

The controller 1890 may include a content modification component 1896. The content modification component 1896 may be configured to modify a virtual focal surface (e.g., the surface 140, 141, 142, or the like) and the projected image (e.g., the image 135, 136, or the like) to adjust the apparent size and position of an object in the image to be projected. With some examples, the virtual focal surface and the projected image are modified in two dimensions. With some examples, the virtual focal surface and the projected image are modified in three dimensions.

With some examples, the content modification component 1896 may modify the image to be projected by varying the resolution of the image across the projection surface (e.g., the surface 102, the surface 137, the surface 138, the surface 149, or the like). For example, the component 1896 may maintain a selected image modulation transfer function (MTF) or optical transfer function (OTF) in the projected image. The MTF can be linked to the contrast between pixels at various positions of the image on the projection surface. As such, the component 1896 may be configured to differentiate two successive pixels by pulsing them at two different time instants resulting in two different locations on the projection surface.

In some examples, the content modification component 1896 may be configured to adjust the projected image by varying the pixel spot size or by adjusting the pulsing of the light source (e.g., the source 105, or the like). For example, instead of projecting the image based on: ON-10 ns (1st pixel), OFF-1 ns, ON-10 ns (2nd pixel), the component 1896 may be configured to specify that the image is projected based on: pulse ON-10 ns (1st pixel), OFF-10 ns, ON-10 ns (2nd pixel). Accordingly, when the source (e.g., the source 105) is OFF, a black portion is created on the projection surface. Therefore, two pixels can be detected if the difference in brightness between the two spots is greater than a desired MTF contrast.

It is to be noted that varying the image resolution on the projection surface does not necessarily mean that the image resolution of the projected virtual image is varied. For example, 1000 pixels per line may be projected onto the projection surface (e.g., 138), but on the virtual surface (e.g., 140), the pixels may overlap. As such, a situation in which the effective resolution is as low as 1 pixel on the projection surface (as only one bundle of pixels overlapping on top of each other may be seen). However, for the virtual image, it may be perceived as "zoomed." In particular, as the same pixels are present, but they are separated from each other, the full resolution may be perceived. Therefore, it is possible to distinguish the pixels from each other for given MTF values.

With some examples, the content modification component 1896 may modify the projected image such that a number of pixels (e.g., four pixels, eight pixels, or the like) can be distinguished on the projection surface. Accordingly, the focus is increased on the projection surface versus the case where a single pixel is distinguished on the projection surface; however, the virtual image may still have the same resolution.

With some examples, the controller 1890 may be configured to cause the system to project complete images at different perceived locations. For example, one image frame or one set of frames can be projected to one location and subsequent images or sets of frames projected to a different location. Accordingly, the perceived projection distance can be set while projecting the virtual image so that the virtual image is perceived at a correct location. For example, if the user is looking at a chair 2 m away, the system 1800 may be configured to project a virtual image of an avatar that is perceived to be sitting on the chair 2 m away, as opposed to sitting 20 m away, which would cause the avatar to be perceived at a different location from the chair.

With some examples, the controller 1890 may be configured to cause the system to project part of the same image at multiple different perceived distances, for example, to create the impression that the object in the virtual image is moving with respect to a viewer or simply to show static virtual images, with different parts of the virtual image having different perceived distances.

In general, the optical systems described herein may be implemented in any of a variety of different optical projection devices, such as, for example, monocular devices, binocular devices, heads-up displays, holographic systems, or the like. Accordingly, the controller 1890 may be configured to cause the system to create 2D (with the distance perception) or real 3D images. In some examples, a monocular device may be implemented to project a 3D virtual image to be perceived as having a continuous depth modification, such as, for example, where the top of the image is perceived at an infinite distance and the bottom of the image is perceived at a short distance.

As another example, a wearable device may be implemented in a binocular system. The controller 1890 may be configured to cause the system to project a real 3D environment by shifting between different images and by perspective image rendering. To further improve the perception of the 3D image, the perspective rendering may be created physically, in the sense that the virtual image distances are physically adjusted.

In some examples, the optical systems may comprise a holographic trans-reflector, which is partly transmissive and partly reflective. In some examples, the optical system may comprise a volume hologram trans-reflector, configured to redirect the light towards a user's eye pupil. In particular, the hologram may be configured to spatially reflect multiple beams representing the same pixel of various wavelengths focusing on the same location on the hologram, towards multiple locations in a user's eye-pupil so as to create multiple eyeboxes. It is noted, that an eyebox is an area, where the viewer still sees the image once moving its eye around. Thus, in order to enlarge the size of the overall eyebox, instead of enlarging the size of the light beam each pixel may be reflected by multiple, for example, three light beams by using three light sources with three different wavelengths. With some examples, the wavelength of the multiple light beams may be close to each other, such that they are perceived as a same or similar color.

For example, three red light sources with wavelengths of 640 mn, 645 nm, 650 nm may be chosen. As the hologram is in this case a wavelength-multiplexed hologram, different wavelengths can be used so that the hologram is able to redirect the three beams in three different spatial positions at the retina. This kind of hologram can redirect light of different wavelengths in different directions, even if the light beams reach the hologram surface acting as a holographic diffuser at the same point and simultaneously (this point is moving as the scanning operation advances). Indeed when doing so and if each of the multiple beams represents the same pixel, and by having those beams reflected towards the eye and reaching the eye at different locations, then the user, once moving the eye, will "switch" from one beam to another beam, but as they all represent the same pixel, the viewer will tend to see the same image while switching the eyebox. For the viewer it will then be perceived as a larger eyebox.

Accordingly, the controller 1890 may be configured to cause the system comprising such a multiplexing hologram to project the light beams at the same location on a holographic diffuser and to dynamically adjust the dynamic lens 123 and/or 127 to generate various focuses so as to generate virtual images with various perceived distances. The controller 1890 may adjust the dynamic lenses 123 and/or 127 individually for each pixel of the projected image. As such, multiple eyeboxes can be generated at a given time instant, where each eyebox may show the same virtual image with a different perceived distance. Thus, in this example, the viewer is able to choose at a given time instant between three different perceived virtual image distances by simply looking at a different eyebox.

The controller 1890 may be configured to cause the system to direct the multiple light beams to a same location at a user retina, thereby generating a single eyebox at a given time instant. In particular, the controller 1890 may be configured to adjust the dynamic lenses 123 and/or 127 individually for each light beam, for example, the focal length of the lens 127 may be adjusted to a first focal length for the first light beam and a second focal length for the second light beam.

In some examples, the controller 1890 may adjust the dynamic lens 123 and/or 127 pixel-by-pixel and/or image frame-by-frame. It is noted, that although the multiple light beam holographic system described above was described with respect to using similar colors, a system projecting multiple beams of different colors could be implemented. Accordingly, the controller 1890 may be configured to adjust the perceived distance of the projected virtual image based on the various wavelengths of the light beams.

Figure 19:
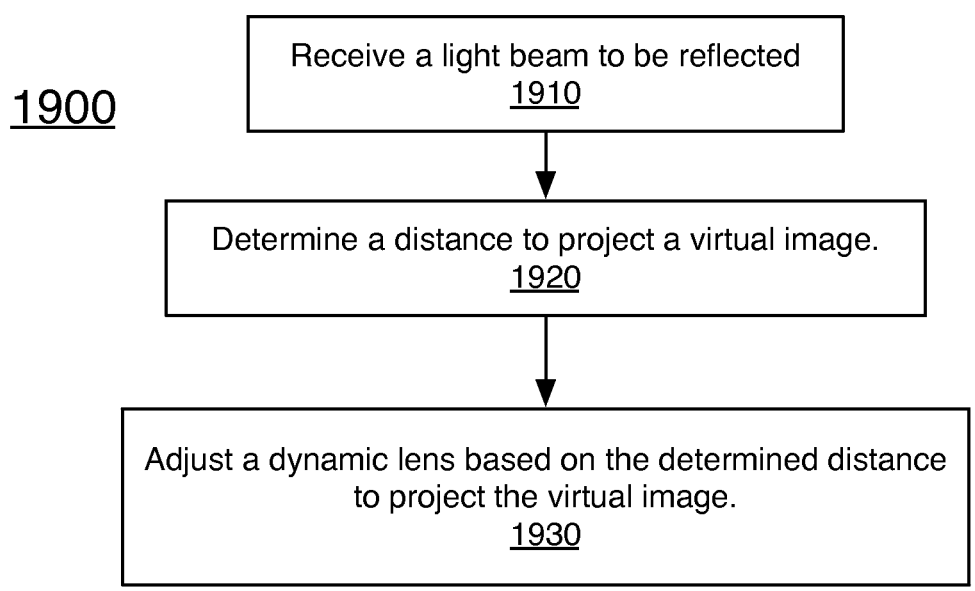
FIG. 19 illustrates a logic flow according to an embodiment.

FIG. 19 depicts a logic flow 1900 for projecting a virtual image. The logic flow 1900 may begin at block 1910. At block 1910 "receive a light beam to be reflected," the mirror 115 may receive a light beam, such as, for example, the light beam 109. In particular, the light source 105 may emit the light beam 109, which is received by the mirror 115. The controller 1890 may be configured to cause the mirror 115 to implement an image raster scanning operation to project a virtual image on the projection surface 102. Additionally, at block 1910, the optical system, and particularly the dynamic lenses 123 and/or 127 may be configured to focus the scanned and reflected light beam to a focal surface (e.g., the projection surface 102, the lens 137, the lens 138, the virtual surface 140, 141, 142, or the like)

Continuing to block 1920 "determine a distance to project a virtual image," the controller 1890 may determine a distance to project a virtual image onto the projection surface. In particular, at block 1920, the controller 1890 may determine and/or sense a viewer's eye position. An object viewed by a viewer may be determined based on the detected eye position and a distance to the detected object may be identified. In some examples, the determined distance to project the virtual image may correspond to the determined distance to the detected object.

Continuing to block 1930 "adjust dynamic lens(es) based on the determined distance to project a virtual image. At block 1930 the controller 1890 may be configured to send a control signal to the lenses 123 and/or 127 to cause the lenses to dynamically adjust (e.g., displace, change focal lengths, or the like) to cause the projected virtual image to be perceived at a distance corresponding to the distance determined at block 1920.

Figure 20:
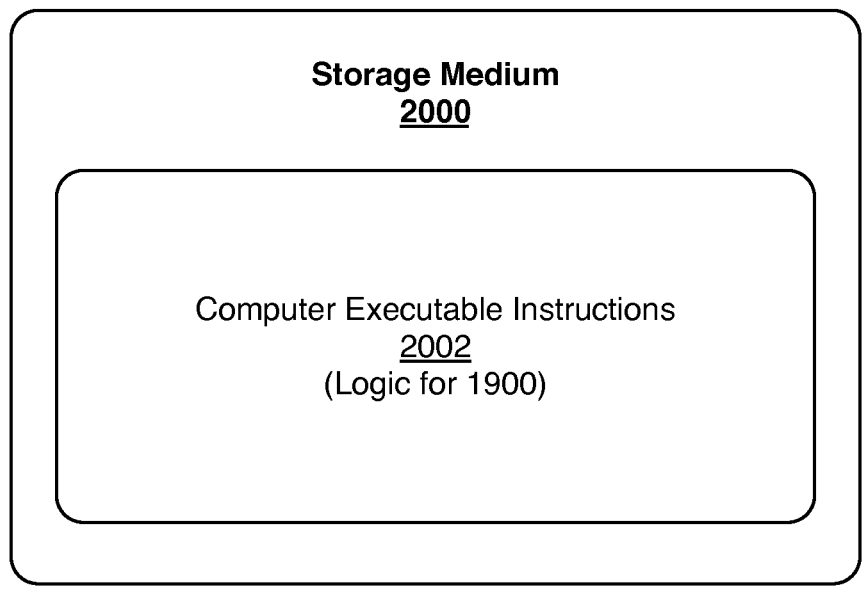
FIG. 20 illustrates a computer readable medium according to an embodiment.

FIG. 20 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002. For example, the storage medium 2000 may store various types of computer executable instructions to implement technique 1900.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 21:
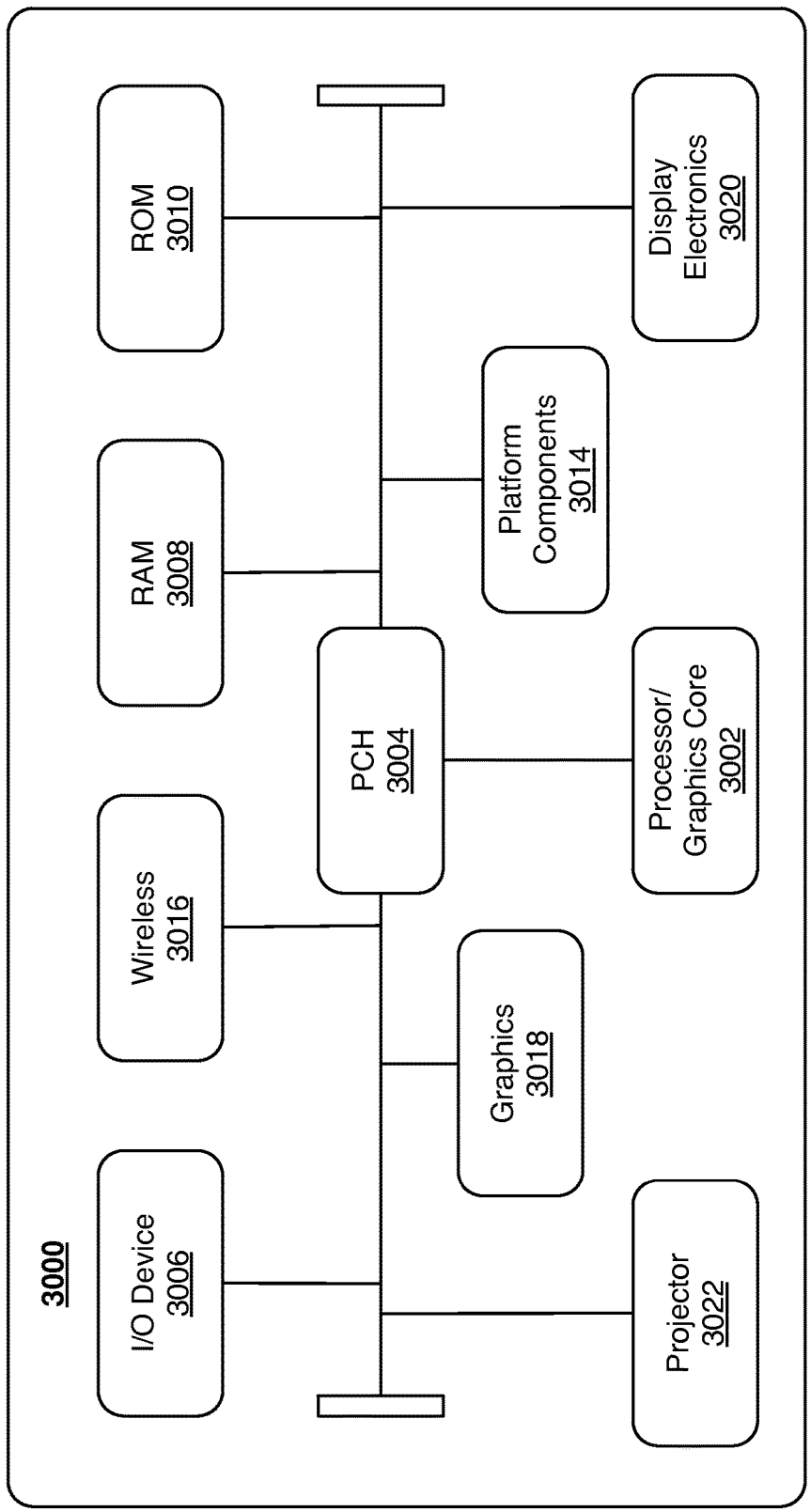
FIG. 21 illustrates a device according to an embodiment.

FIG. 21 is a diagram of an exemplary system embodiment and in particular, depicts a platform 3000, which may include various elements. For instance, this figure depicts that platform (system) 3000 may include a processor/graphics core 3002, a chipset/platform control hub (PCH) 3004, an input/output (I/O) device 3006, a random access memory (RAM) (such as dynamic RAM (DRAM)) 3008, and a read only memory (ROM) 3010, display electronics 3020, display 3022 (e.g., including the optical systems described above, such as, for example, the system 101, 201, 301, 401, 501, 701, 801, 901, 1001, 1200, 1700, 1800, or the like), and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements.

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores. The processor 3002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Example 1

An apparatus, comprising: a scanning mirror to receive a light beam and to reflect the received light beam; a dynamic optical lens for focusing the reflected light beam at a focal plane to project a virtual image; and a controller to send a control signal to the dynamic optical lens to cause the dynamic optical lens to adjust during projection of the virtual image.

Example 2

The apparatus of example 1, wherein the dynamic optical lens is a variable position lens, the controller to send a control signal to the variable position lens to cause the variable position lens change position with respect to the scanning mirror.

Example 3

The apparatus of example 1, wherein the dynamic optical lens is a variable focal length lens, the controller to send a control signal to the variable focal length lens to cause the variable focal length lens change focal lengths.

Example 4

The apparatus of example 1, the scanning mirror rotatable around a first axis and a second axis different from the first axis.

Example 5

The apparatus of example 1, the scanning mirror to project an image at a projection surface, the focal plane coincident with the projection surface.

Example 6

The apparatus of example 1, the scanning mirror to project an image at a projection surface, the focal plane proximate to the projection surface.

Example 7

The apparatus of any one of examples 5 to 6, the projection surface to reflect a portion of the light beam, the dynamic optical lens to focus the light beam on the focal plane so the reflected portion of the light beam is collimated or divergent so a projected image is to be perceived as the projected virtual image.

Example 8

The apparatus of example 7, wherein the focal plane is a virtual focal surface.

Example 9

The apparatus of example 1, wherein the projection surface is semi-transparent.

Example 10

The apparatus of example 1, comprising at least one optical element disposed between the scanning mirror and a projection surface, the at least one optical element to converge the reflected light beam and to redirect the converged light beam to the projection surface.

Example 11

The apparatus of example 1, comprising a fixed position projection lens disposed between the scanning mirror and the focal plane to focus the reflected light.

Example 12

The apparatus of example 1, wherein the dynamic optical lens is disposed before the scanning mirror with respect to the received light beam.

Example 13

The apparatus of example 1, wherein the focal plane comprises a projection surface.

Example 14

The apparatus of example 1, wherein the focal plane is planar, spherical, aspherical, or polynomial.

Example 15

A system for projecting an image comprising: a light source to emit a light beam; a scanning mirror to receive the light beam and to reflect the received light beam; a dynamic optical lens for focusing the reflected light beam at a focal plane to project a virtual image; and a controller to send a control signal to the dynamic optical lens to cause the dynamic optical lens to adjust during projection of the virtual image.

Example 16

The system of example 15, the scanning mirror to reflect the light beam onto a projection surface, the projection surface to reflect a portion of the light beam, the dynamic optical lens to focus the light beam on the focal plane so the reflected portion of the light beam is collimated or divergent so a projected image is to be perceived as the projected virtual image.

Example 17

The system of example 16, comprising the projection surface.

Example 18

The system of example 17, wherein the projection surface is a spectacle lens, a helmet visor, or a windshield.

Example 19

The system of example 17, wherein the projection surface is semi-transparent.

Example 20

The system of example 16, wherein the focal plane is coincident with the projection surface.

Example 21

The system of example 16, wherein the focal plane is proximate to the projection surface.

Example 22

The system of example 16, wherein the dynamic optical lens is a variable position lens, the controller to send a control signal to the variable position lens to cause the variable position lens change position with respect to the scanning mirror.

Example 23

The system of example 15, wherein the dynamic optical lens is a variable focal length lens, the controller to send a control signal to the variable focal length lens to cause the variable focal length lens change focal lengths.

Example 24

The system of example 15, the scanning mirror rotatable around a first axis and a second axis different from the first axis.

Example 25

The system of example 15, wherein the focal plane is a virtual focal surface.

Example 26

The system of example 16, comprising at least one optical element disposed between the scanning mirror and the projection surface, the at least one optical element to converge the reflected light beam and to redirect the converged light beam to the projection surface.

Example 27

The system of example 15, comprising a fixed position projection lens disposed between the scanning mirror and the focal plane to focus the reflected light.

Example 28

The system of example 15, wherein the dynamic optical lens is disposed before the scanning mirror and the light source.

Example 29

The system of example 15, wherein the focal plane is planar, spherical, aspherical, or polynomial.

Example 30

The system of example 15, comprising a collimation lens disposed between the light source and the dynamic optical lens to collimate the light beam.

Example 31

The system of example 15, wherein the dynamic lens is disposed between the scanning mirror and the focal plane.

Example 32

The system of example 31, comprising a collimation lens disposed between the light source and the scanning mirror for collimating the light beam.

Example 33

The system of example 24, wherein the scanning mirror oscillates more slowly about the first axis than about the second axis, the control to orient the first axis along a in which the projected image has the largest variation in distance between the scanning mirror and the focal plane.

Example 34

The system of example 16, wherein the projection surface comprises a hologram and wherein one image pixel on the projection surface is projected by using more than one light beam, each light beam projecting the same pixel having a different wavelength from each other, the dynamic optical lens to adjust the focus of each of the light beams individually.

Example 35

A method to project a virtual image, the method comprising: receiving a light beam; reflecting the light beam onto a projection surface; transmitting the reflected light beam through a dynamic optical lens to focus the reflected light beam at a focal plane to project a virtual image; and adjusting the dynamic optical lens during projection of the virtual image.

Example 36

The method of example 35, comprising rotating a mirror about a first axis and a second axis different than the first axis to reflect the light beam onto the projection surface.

Example 37

The method of example 35, comprising sending a control signal to the dynamic optical lens to cause the dynamic optical lens to change position to vary a depth of the focal plane.

Example 38

The method of example 35, comprising sending a control signal to the dynamic optical lens to cause the dynamic optical lens to change focal lengths to vary a depth of the focal plane.

Example 39

The method of example 35, comprising: detecting an eye position of a viewer; detecting an object based on the detected eye position; and determining a distance to the object, wherein the dynamic optical lens is adjusted based on the determined distance.

Example 40

At least one non-transitory computer-readable storage medium comprising instructions that, when executed by a processor, cause the processor to: send a control signal to a dynamic optical lens to adjusting the dynamic optical lens during projection of a virtual image, wherein the virtual image is projected by receiving a light beam, reflecting the light beam onto a projection surface, and transmitting the reflected light beam through the dynamic optical lens to focus the reflected light beam at a focal plane to project the virtual image.

Example 41

The at least one non-transitory computer-readable storage medium of example 40, the instructions cause the processor to send a control signal to the dynamic optical lens to cause the dynamic optical lens to change position to vary a depth of the focal plane.

Example 42

The at least one non-transitory computer-readable storage medium of example 40, the instructions cause the processor to sending a control signal to the dynamic optical lens to cause the dynamic optical lens to change focal lengths to vary a depth of the focal plane.

Example 43

An apparatus comprising means to perform the method of any one of examples 35 to 39.

What is claimed is:

1. An apparatus, comprising:
    a scanning mirror to receive at least two light beams and to reflect the received light beams, each of the at least two light beams having different wavelengths from each other;
    at least one dynamic optical lens to focus the reflected light beams at a virtual focal surface to project a virtual image comprising at least one pixel, the at least one pixel projected based on the at least two light beams, the virtual focal surface being non-perpendicular to a chief ray of the reflected light beams, wherein the at least one dynamic optical lens includes a variable position lens and a variable focal length lens;
    a distance measurement component to determine a distance to an object viewed by the viewer; and
    a controller operably coupled to send a control signal to adjust the at least one dynamic optical lens to cause the projected virtual image to be perceived by the viewer at a location based on the distance determined by the distance measurement component, the controller to send a control signal to the at least one dynamic optical lens to cause the variable position lens to change position with respect to the scanning mirror and the controller to send a control signal to the at least one dynamic optical lens to cause the variable focal length lens to change focal lengths.

2. The apparatus of claim 1, the scanning mirror rotatable around a first axis and a second axis different from the first axis.

3. The apparatus of claim 1, wherein the virtual focal surface is planar, spherical, aspherical, or polynomial.

4. The apparatus of claim 1, wherein the virtual image is projected at an apparent distance which corresponds to the distance to the object viewed by the viewer determined by the distance measurement component.

5. The apparatus of claim 1, further comprising an eye-tracking component, the distance measurement component operably coupled to the eye-tracking component.

6. The apparatus of claim 5, wherein the eye-tracking component detects an eye position of a viewer to determine the object viewed by the viewer.

7. A system for projecting an image comprising:
    a light source to emit at least two light beams, the at least two light beams having different wavelengths from each other;
    a scanning mirror to receive the at least two light beams and to reflect the received light beams;
    at least one dynamic optical lens to focus the reflected light beams at a virtual focal surface to project a virtual image comprising at least one pixel, the at least one pixel projected based on the at least two light beams, the virtual focal surface being non-perpendicular to a chief ray of the reflected light beams, wherein the at least one dynamic optical lens includes a variable position lens and a variable focal length lens;
    a distance measurement component to determine a distance to an object viewed by the viewer; and a controller operably coupled to send a control signal to adjust the at least one dynamic optical lens to cause the projected virtual image to be perceived by the viewer at a location based on the distance determined by the distance measurement component, the controller to send a control signal to the at least one dynamic optical lens to cause the variable position lens to change position with respect to the scanning mirror and the controller to send a control signal to the at least one dynamic optical lens to cause the variable focal length lens to change focal lengths.

8. The system of claim 7, the scanning mirror to reflect the light beams onto the projection surface, the projection surface to reflect a portion of the light beams, the at least one dynamic optical lens to focus the light beams on the virtual focal surface so the reflected portion of the light beams is collimated or divergent so a projected image is to be perceived as the projected virtual image.

9. The system of claim 7, wherein the projection surface is a spectacle lens, a helmet visor, or a windshield.

10. The system of claim 7, wherein the projection surface is semi-transparent.

11. The system of claim 7, the scanning mirror rotatable around a first axis and a second axis different from the first axis.

12. The system of claim 11, wherein the scanning mirror oscillates more slowly about the first axis than about the second axis, the control to orient the first axis along an axes in which the projected image has the largest variation in distance between the scanning mirror and the virtual focal surface.

13. The system of claim 7, wherein the virtual image is projected at an apparent distance which corresponds to the distance to the object viewed by the viewer determined by the distance measurement component.

14. The system of claim 7, further comprising an eye-tracking component, the distance measurement component operably coupled to the eye-tracking component.

15. The system of claim 14, wherein the eye-tracking component detects an eye position of a viewer to determine the object viewed by the viewer.

16. A method to project a virtual image, the method comprising:
receiving at least two light beams having different wavelengths;
reflecting the at least two light beams;
transmitting the reflected light beams through at least one dynamic optical lens to focus the reflected light beams at a virtual focal surface to project a virtual image comprising at least one pixel, the at least one pixel projected based on the at least two light beams, the virtual focal surface being non-perpendicular to a chief ray of the reflected light beams;
determining, by a distance measuring component, a distance to an object viewed by the viewer; and
adjusting, by a controller, the at least one dynamic optical lens to cause the projected virtual image to be perceived by the viewer at a location based on the distance determined by the distance measurement component, wherein adjusting, by the controller, the at least one dynamic optical lens includes sending a control signal to the at least one dynamic optical lens to cause the at least one dynamic optical lens to change position to vary a depth of the virtual focal surface and sending a control signal to the at least one dynamic optical lens to cause the at least one dynamic optical lens to change focal lengths to vary a depth of the virtual focal surface.

17. The method of claim 16, comprising rotating a mirror about a first axis and a second axis different than the first axis to reflect the light beams onto the projection surface.

18. The method of claim 16, wherein the virtual image is projected at an apparent distance which corresponds to the distance to the object viewed by the viewer determined by the distance measurement component.

19. The method of claim 16, wherein the distance measurement component is operably coupled to an eye-tracking component.

20. The method of claim 19, wherein the eye-tracking component detects an eye position of a viewer to determine the object viewed by the viewer.

* * * * *